United States Patent Office 2,698,294
Patented Dec. 28, 1954

2,698,294

PARAFFIN SOLVENT FOR USE IN TREATING OIL WELLS, OIL WELL TUBING, OIL FLOW LINES, OIL STORAGE TANKS, AND THE LIKE

Jack Kelly, Basin, Wyo.; Jeanne Kelly, administratrix of said Jack Kelly, deceased, assignor to Jeanne Kelly, Basin, Wyo.

No Drawing. Application June 20, 1950, Serial No. 169,295

3 Claims. (Cl. 252—8.55)

This invention relates to improvements in compositions for treating contaminated crude oil. It is a paraffin solvent for use in oil wells or wherever paraffin is present and functions to improve oil production.

A further object of this invention is the provision of a solvent composition which includes an efficient mixture of materials of such specific gravity as to be maintained in a body of oil, such as in an oil well, at a proper location so that it may best function as a paraffin solvent to enhance the flow of oil.

The improved composition of matter includes the following ingredients and their respective proportions:

|  | Percent by weight |
|---|---|
| Turpentine | 45 to 55 |
| Creosote | 25 to 40 |
| Water | 10 to 15 |
| Caustic soda | 1 to 5 |

The solvent is preferably prepared by mixing caustic soda with the water constituent. They are permitted to stand until the mixture has reached substantially the same temperature as the surrounding atmosphere. The other ingredients, creosote and turpentine, are then thoroughly mixed together. The caustic soda solution is then added to the creosote-turpentine mixture and all of the ingredients thoroughly mixed.

The turpentine ingredient acts as a solvent for praraffin. The activity of the composition is increased by means of the caustic soda (sodium hydroxide). These two ingredients decrease the time element in treating contaminated oils and oil wells for dissolving paraffin.

Just sufficient water is used with the caustic soda ingredient to make it solvent. If used in concentrated form the caustic soda would be injurious to machinery, pumping equipment, etc. Under test it has been found that the caustic soda in the solution designated, will not appreciably injure new pumping cups.

The creosote ingredient is manufactured from wood tar, which of course is derived from the destructive distillation of resinous pine wood. It is preferred to use the lower grades of creosote having an approximate wood phenol content of from 10% to 12%. Creosote binds the solution together and holds it in stable emulsified condition within ranges of temperature of from sub-zero to summer heat. Another function of creosote is that it serves as a weighting agent to hold the composition of matter at a desired level or below the desired fluid level in particular cases, so that it may work efficiently at the seat of trouble, say in the vicinity of paraffin coated oil bearing sands in an oil well. In this respect the lower grade creosote is especially desirable because it has a heavier specific gravity than some of the higher grades.

The proportion of ingredients may vary to suit different types of crude oils whose paraffin bases vary from light to heavy.

In oil wells it is well known that paraffin builds up in the vicinity of the incoming oil, gradually shutting off the flow of oil from oil bearing sands and formations. The present solvent penetrates the formation and will dissolve the paraffin gradually; eventually raising the gravity of the oil and increasing its commercial value.

The solution is especially desirable in cleaning out paraffin which collects in the tubing of producing wells. This eliminates use of expensive labor, wear and tear upon equipment used in pulling tubing.

The improved solution is useful in oil flow lines, since it will clean out the paraffin and thus increase the volume or capacity of the lines for carrying oil.

The solution is also useful in oil storage tanks, where it will dissolve the paraffin which collects at the base of the tank and around the intake and outlet connection.

I have found an optimum paraffin solvent for certain work which consists of:

|  | Lbs. by weight |
|---|---|
| Turpentine | 325 |
| Creosote | 172 |
| Water | 80 |
| Caustic soda | 9¾ |

The following test will serve to show the efficiency of the improved composition of matter:

*Test run*

The improved paraffin solvent was used in a well which had been dry for five years. The pumping equipment had been left in the well during all this period. Fifty gallons of the improved composition of matter were placed in the bottom of the well and circulated from the bottom to a tank on the derrick floor. Constant agitation by the circulation method at the end of five hours slowed the presence of paraffin in the solution. At the end of ten hours the paraffin in the well had been softened and commenced to exude from the well in thick rope-like lengths of from 8 to 12 inches. Nine conventional size drums of paraffin were collected from the well besides that which had fallen upon the ground, which likely would have filled two or three more drums. After twenty-four hours of treatment the well was put on a twenty-four test for production. It gave 32 barrels of oil per twenty-four hour test. Gradually, production settled down to 34 barrels per twenty-four hours of run.

The solvent wil work in wells bringing in as a high volume of water as 10%, either brine free water or brine water. Therefore, it is necessary to vary the ingredients of the solution within the ranges above specified, since the more water in the well bore, the greater concentrate of the solution to overcome the diluting of the solution's strength thru the water coming into the well.

The improved paraffin solution will:
 (a) Prove economical in operating costs.
 (b) Decrease the wear and tear upon well pumping and other machinery.
 (c) Increase the raw production of the well.
 (d) Prove safe to operate.
 (e) Prove useful in dissolving paraffin wherever it is necessary in order to increase the gravity and purity of the oil.

Various changes in the proportioning of the ingredients may be made to the composition herein specified without departing from the spirit of the invention or the scope of the claims.

I claim:

1. A weighted emulsified paraffin solvent for use in connection with the treatment of petroleum oils, comprising a solvent consisting of turpentine, 45% to 55%, an emulsifying and weighting agent consisting of creosote, 25% to 40%, together with sodium hydroxide, 1% to 5%, dissolved in water 10% to 15%, said percentages being by weight.

2. A weighted emulsified paraffin solvent for use in connection with the treatment of petroleum oils, comprising a solvent consisting of turpentine 325 lbs., an emulsifying and weighting agent consisting of pine wood creosote 172 lbs., together with sodium hydroxide 9.75 lbs., dissolved in water 80 lbs.

3. A weighted emulsified paraffin solvent for use in connection with the treatment of petroleum oils, comprising turpentine in a major percentage, approximately 30% of an emulsifying and weighting agent consisting of creosote, and an aqueous solution of sodium hydroxide consisting of 1% to 5% sodium hydroxide in 10% to 15% water, all of said percentages being by weight of the entire weight of said weighted emulsified paraffin solvent.

References Cited in the file of this patent

UNITED STATES PATENTS

| Number | Name | Date |
|---|---|---|
| 1,513,371 | Campbell | Oct. 28, 1924 |
| 1,595,690 | Schwarzkoff | Aug. 10, 1926 |
| 1,717,023 | Gowell | June 11, 1929 |
| 1,907,796 | Hall | May 9, 1933 |
| 2,438,682 | Roberts | Mar. 30, 1948 |